(12) United States Patent
Maeda

(10) Patent No.: US 11,505,896 B2
(45) Date of Patent: Nov. 22, 2022

(54) SYNTHETIC LEATHER

(71) Applicant: DIC Corporation, Tokyo (JP)

(72) Inventor: Ryo Maeda, Osaka (JP)

(73) Assignee: DIC CORPORATION, Tokyo (JP)

(*) Notice: Subject to any disclaimer, the term of this patent is extended or adjusted under 35 U.S.C. 154(b) by 248 days.

(21) Appl. No.: 16/648,396

(22) PCT Filed: Jun. 28, 2018

(86) PCT No.: PCT/JP2018/024563
§ 371 (c)(1),
(2) Date: Mar. 18, 2020

(87) PCT Pub. No.: WO2019/058692
PCT Pub. Date: Mar. 28, 2019

(65) Prior Publication Data
US 2020/0263352 A1    Aug. 20, 2020

(30) Foreign Application Priority Data

Sep. 19, 2017   (JP) .............................. JP2017-178855

(51) Int. Cl.
C08G 18/44    (2006.01)
D06N 3/14     (2006.01)
C08G 18/48    (2006.01)
C08G 18/61    (2006.01)

(52) U.S. Cl.
CPC ............... D06N 3/14 (2013.01); C08G 18/44 (2013.01); C08G 18/48 (2013.01); C08G 18/61 (2013.01)

(58) Field of Classification Search
CPC ......... D06N 3/145; D06N 3/128; C08G 18/61
See application file for complete search history.

(56) References Cited

U.S. PATENT DOCUMENTS

2002/0018892 A1* 2/2002 Satake ............... C08G 18/6659
                                                428/355 R
2018/0142409 A1   5/2018 Maeda

FOREIGN PATENT DOCUMENTS

| JP | 02112486 A | * | 4/1990 | ............. C08G 18/61 |
| JP | 2002-088662 A | | 3/2002 | |
| JP | 2005-076157 A | | 3/2005 | |
| JP | 2007-119749 A | | 5/2007 | |
| JP | 2009-275173 A | | 11/2009 | |
| JP | 6179697 B1 | | 8/2017 | |
| WO | WO-2015059924 A1 | * | 4/2015 | ............. B32B 27/12 |

OTHER PUBLICATIONS

Espacenet Translation of JP 2007119749 (Year: 2022).*
Espacenet Translation of JP 2009275173 (Year: 2022).*
International Search Report issued in corresponding International Patent Application No. PCT/JP2018/024563, dated Sep. 18, 2018, with Engish translation.

* cited by examiner

Primary Examiner — Michael M Dollinger
(74) Attorney, Agent, or Firm — McDermott Will & Emery LLP

(57) ABSTRACT

The present invention is a synthetic leather including a base fabric (i), an intermediate layer (ii), and a skin layer (iii), in which the intermediate layer (ii) is formed of an aqueous urethane resin composition (C) containing a urethane resin (A) and an aqueous medium (B), the urethane resin (A) is a reaction product of a polyol (a1) containing a polyol (a1-1) having an anionic group and an aromatic polyisocyanate (a2), and has an anionic group in a concentration of 0.35 mmol/g or less, the skin layer (iii) is formed of an aqueous urethane resin composition (Z) containing a urethane resin (X) and an aqueous medium (Y), and the urethane resin (X) is a reaction product obtained by using a polyol (b1), a reactive silicone (b2) having a functional group which reacts with an isocyanate group, and a polyisocyanate (b3) as essential raw materials.

6 Claims, No Drawings

SYNTHETIC LEATHER

CROSS REFERENCE TO RELATED APPLICATIONS

This patent application is the U.S. National Phase under 35 U.S.C. § 371 of International Application No. PCT/JP2018/024563, filed on Jun. 28, 2018, which claims the benefit of Japanese Patent Application No. 2017-178855, filed on Sep. 19, 2017, the entire contents of each are hereby incorporated by reference.

TECHNICAL FIELD

The present invention relates to a synthetic leather.

BACKGROUND ART

A polyurethane resin is widely used in the production of a synthetic leather (including an artificial leather) due to mechanical strength and good texture of the resin. In the application, a solvent-based urethane resin containing N,N-dimethylformamide (DMF) has been the mainstream so far. However, due to DMF regulation in Europe, strengthening of VOC emission regulation in China and Taiwan, and DMF regulation by major apparel makers, de-DMF of a urethane resin for each layer constituting a synthetic leather has been required.

To be compatible with such an environment, an aqueous urethane resin composition in which a urethane resin is dispersed in water has been widely studied (for example, see PTL 1). As in the invention described in PTL 1, for a skin layer of a synthetic leather, the replacement of a solvent-based urethane resin with an aqueous urethane resin is gradually increasing in the market, but use of an aqueous urethane resin for an intermediate layer has not yet progressed. This is mainly because the peeling strength of the aqueous urethane resin is insufficient compared with the solvent-based urethane resin. Therefore, it has been still difficult to produce an environmentally compatible synthetic leather for both the intermediate layer and the skin layer.

CITATION LIST

Patent Literature

PTL 1: JP-A-2007-119749

SUMMARY OF INVENTION

Technical Problem

An object to be achieved by the present invention is to provide a synthetic leather having excellent abrasion resistance, peeling strength, hydrolysis resistance, and light resistance.

Solution to Problem

The present invention provides a synthetic leather at least including abase fabric (i), an intermediate layer (ii), and a skin layer (iii), in which the intermediate layer (ii) is formed of an aqueous urethane resin composition (C) containing a urethane resin (A) and an aqueous medium (B), the urethane resin (A) is a reaction product of a polyol (a1) containing a polyol (a1-1) having an anionic group and an aromatic polyisocyanate (a2), and has an anionic group in a concentration of 0.35 mmol/g or less, the skin layer (iii) is formed of an aqueous urethane resin composition (Z) containing a urethane resin (X) and an aqueous medium (Y), and the urethane resin (X) is a reaction product obtained by using a polyol (b1), a reactive silicone (b2) having a functional group which reacts with an isocyanate group, and a polyisocyanate (b3) as essential raw materials.

Advantageous Effects of Invention

The synthetic leather of the present invention has excellent environmental compatibility because both the intermediate layer and the skin layer are formed of an aqueous urethane resin composition, and has excellent abrasion resistance, peeling strength, hydrolysis resistance, and light resistance.

Therefore, the synthetic leather of the present invention can be used for applications requiring high durability, such as an automobile interior material, furniture, and sports shoes, for which the replacement of a solvent-based urethane resin with an aqueous urethane resin has been considered difficult.

DESCRIPTION OF EMBODIMENTS

The synthetic leather of the present invention is a synthetic leather at least including a base fabric (i), an intermediate layer (ii), and a skin layer (iii), in which the intermediate layer (ii) is formed of an aqueous urethane resin composition (C) containing a urethane resin (A) and an aqueous medium (B), the urethane resin (A) is a reaction product of a polyol (a1) containing a polyol (a1-1) having an anionic group and an aromatic polyisocyanate (a2), and has an anionic group in a concentration of 0.35 mmol/g or less, the skin layer (iii) is formed of an aqueous urethane resin composition (Z) containing a urethane resin (X) and an aqueous medium (Y), and the urethane resin (X) is a reaction product obtained by using a polyol (b1), reactive silicone (b2) having a functional group which reacts with an isocyanate group, and a polyisocyanate (b3) as essential raw materials.

As the base fabric (i), for example, a non-woven fabric, a woven fabric, a knit, or the like made of polyester fiber, polyethylene fiber, nylon fiber, acrylic fiber, polyurethane fiber, acetate fiber, rayon fiber, polylactic acid fiber, cotton, hemp, silk, wool, glass fiber, carbon fiber, and blended fiber thereof can be used. Moreover, as the base fabric (i), a known impregnated base fabric obtained by impregnating these fabrics with a polyurethane resin can also be used.

It is essential that the intermediate layer (ii) is formed of the aqueous urethane resin composition (C) containing the urethane resin (A) and the aqueous medium (B), and the urethane resin (A) is a reaction product of the polyol (a1) containing the polyol (a1-1) having an anionic group and the aromatic polyisocyanate (a2), and has an anionic group in a concentration of 0.35 mmol/g or less.

The polyol (a1-1) having an anionic group is a raw material for obtaining an anionic urethane resin, and for example, polyol having a carboxyl group, such as 2,2'-dimethylolpropionic acid, 2,2'-dimethylolbutanoic acid, 2,2'-dimethylolbutyric acid, and 2,2'-valeric acid; polyol having a sulfonyl group, such as 3,4-dimethylolbutanesulfonic acid and 3,6-dimethylol-2-toluenesulfonic acid; or the like can be used. These compounds may be used alone or in a combination of two or more kinds thereof.

From the viewpoint that the concentration of the anionic group in the polyurethane resin (A) is easily prepared within the range described in the present invention, and far superior hydrolysis resistance is obtained, the content of the polyol (a1-1) in the polyol (a1) is preferably 0.05% to 10% by mass, more preferably 0.1% to 6.2% by mass, still more preferably 0.5% to 3% by mass, and particularly preferably 1% to 2.7% by mass.

In the polyol (a1), as polyol which can be used other than the polyol (a1-1), for example, polyether polyol, polyester polyol, polycarbonate polyol, dimer diol, acrylic polyol, polybutadiene polyol, or the like can be used. The polyol may be used alone or in a combination of two or more kinds thereof. Among them, from the viewpoint that hydrolysis resistance can be further improved, polyether polyol and/or polycarbonate polyol is preferably used.

From the viewpoint that far superior peeling strength, mechanical strength of the film, and hydrolysis resistance are obtained, the number-average molecular weight of the polyol (a1) is preferably 500 to 10,000 and more preferably 800 to 5,000. Moreover, the number-average molecular weight of the polyol (a1) indicates a value obtained by a gel permeation column chromatography (GPC) method.

The polyol may be used in a combination with a chain extender (having no carboxyl group), if necessary. As the chain extender, for example, a chain extender having a hydroxyl group, a chain extender having an amino group, or the like can be used. These chain extenders may be used alone or in a combination of two or more kinds thereof. Among them, from the viewpoint that far superior light resistance is obtained, a chain extender having a hydroxyl group is preferably used.

As the chain extender having a hydroxyl group, for example, an aliphatic polyol compound such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; an aromatic polyol compound such as bisphenol A, 4,4'-dihydroxydiphenyl, 4,4'-dihydroxydiphenyl ether, 4,4'-dihydroxydiphenylsulfone, hydrogenated bisphenol A, and hydroquinone; water; or the like can be used. These chain extenders may be used alone or in a combination of two or more kinds thereof. Among them, from the viewpoint that discoloration is easily prevented and far superior light resistance is obtained, an aliphatic polyol compound is preferably used.

As the chain extender having an amino group, for example, ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine, triethylenetetramine, or the like can be used. These chain extenders may be used alone or in a combination of two or more kinds thereof.

When the chain extender (a3) is used, the amount of the chain extender used is preferably 0.5% to 40% by mass and more preferably 1% to 20% by mass in the total mass of the core raw materials constituting the urethane resin (A), from the viewpoint that durability of the film can be further improved.

The aromatic polyisocyanate (a2) has a strong intermolecular force and is an essential component for obtaining excellent peeling strength due to a packing effect. As the aromatic polyisocyanate (a2), for example, phenylene diisocyanate, toluene diisocyanate, diphenylmethane diisocyanate, naphthalene diisocyanate, polymethylene polyphenyl polyisocyanate, carbodiimidated diphenylmethane polyisocyanate, or the like can be used. The aromatic polyisocyanate may be used alone or in a combination of two or more kinds thereof. Among them, from the viewpoint that crystallinity is adequately weak and far superior peeling strength is obtained, toluene diisocyanate is preferably used.

When toluene diisocyanate is used as the aromatic polyisocyanate (a2), the amount of the toluene diisocyanate used is preferably 50% by mass or more and more preferably 70% by mass or more in the aromatic polyisocyanate (a2), from the viewpoint that far superior peeling strength is obtained.

The aromatic polyisocyanate (a2) may be used in a combination with aliphatic or alicyclic polyisocyanate as long as the effects of the present invention are not impaired. As the aliphatic or alicyclic polyisocyanate, for example, aliphatic or alicyclic polyisocyanate such as hexamethylene diisocyanate, lysine diisocyanate, cyclohexane diisocyanate, isophorone diisocyanate, dicyclohexyl methane diisocyanate, xylylene diisocyanate, tetramethyl xylylene diisocyanate, dimer acid diisocyanate, norbornene diisocyanate, and the like can be used. The polyisocyanate may be used alone or in a combination of two or more kinds thereof.

Examples of a method for producing the urethane resin (A) include a method in which the polyol (a1), the aromatic polyisocyanate (a2), and if necessary, the chain extender (a3) are charged at once and reacted with one another. The reaction may be carried out, for example, at a temperature of 50° C. to 100° C. for 3 to 10 hours.

A molar ratio [(isocyanate group)/(total of hydroxyl group and amino group)] of the isocyanate group of the aromatic polyisocyanate (a2) to the hydroxyl group of the polyol (a1) and, when the chain extender is used, the total of the hydroxyl group and/or the amino group of the chain extender is preferably 0.8 to 1.2 and more preferably 0.9 to 1.1.

When the urethane resin (A) is produced, the isocyanate groups remaining in the urethane resin (A) are preferably deactivated. When the isocyanate groups are deactivated, alcohol having a hydroxyl group, such as methanol, is preferably used. When the alcohol is used, the amount of the alcohol used is preferably 0.001 to 10 parts by mass with respect to 100 parts by mass of the urethane resin (A).

Furthermore, when the urethane resin (A) is produced, an organic solvent may be used. As the organic solvent, for example, a ketone compound such as acetone and methyl ethyl ketone; an ether compound such as tetrahydrofuran and dioxane; an acetate ester compound such as ethyl acetate and butyl acetate; a nitrile compound such as acetonitrile; an amide compound such as a dimethylformamide and N-methylpyrrolidone; or the like can be used. These organic solvents may be used alone or in a combination of two or more kinds thereof. Moreover, the organic solvent is preferably removed by a distillation method or the like when the aqueous urethane resin composition (C) is obtained.

In a case of the urethane resin (A) obtained by the method, in order to obtain excellent hydrolysis resistance, it is essential that the concentration of the anionic group is 0.35 mmol/g or less. Within this range, while water dispersibility or peeling strength of the urethane resin (A) is maintained, degradation in hydrolysis resistance due to a hydrophilic group can be prevented. From the viewpoint that far superior hydrolysis resistance is obtained, the concentration of the anionic group in the urethane resin (A) is preferably 0.25 mmol/g or less, more preferably 0.005 to 0.25 mmol/g, and still more preferably 0.01 to 0.22 mmol/g. Moreover, the concentration of the anionic group in the urethane resin (A) indicates a value obtained by dividing the number of moles of the anionic group derived from the polyol (a1-1) having the anionic group by the total mass of the respective raw materials constituting the urethane resin (A).

Furthermore, from the viewpoint that far superior peeling strength is obtained, the concentration of the aromatic ring in the urethane resin (A) is preferably 0.1 to 2.5 mol/kg and more preferably 0.3 to 2.0 mol/kg. In the calculation, the molecular weight of benzene or naphthalene having no substituent is used as the molecular weight of the aromatic ring.

From the viewpoint that far superior peeling strength is obtained, the weight-average molecular weight of the urethane resin (A) is preferably 2,000 to 150,000, more preferably 4,000 to 100,000, and still more preferably 6,000 to 70,000. Moreover, the weight-average molecular weight of the urethane resin (A) indicates a value obtained by measuring in the same manner as the number-average molecular weight of the polyol (a1).

As the aqueous medium (B), for example, water, an organic solvent miscible with water, a mixture thereof, or the like can be used. As the organic solvent miscible with water, for example, an alcohol solvent such as methanol, ethanol, and n- and isopropanol; a ketone solvent such as acetone and methyl ethyl ketone; a polyalkylene glycol solvent such as ethylene glycol, diethylene glycol, and propylene glycol; an alkyl ether solvent such as a polyalkylene glycol; a lactam solvent such as N-methyl-2-pyrrolidone; or the like can be used. These aqueous media may be used alone or in a combination of two or more kinds thereof. Among them, from the viewpoint of safety and reduction in an environmental load, only water or a mixture of water and an organic solvent miscible with water is preferably used and only water is more preferably used. From the viewpoint of workability, coatability, and storage stability, the content of the aqueous medium (B) in the aqueous urethane resin composition (C) is preferably 20% to 90% by mass and more preferably 40% to 80% by mass.

The aqueous urethane resin composition (C) used in the present invention contains the urethane resin (A) and the aqueous medium (B) as essential components.

However, as other additives, for example, a urethanization catalyst, a neutralizer, a crosslinking agent, a silane coupling agent, a thickener, a filler, a thixotropic agent, a tackifier, a wax, a heat stabilizer, a light-resistant stabilizer, a fluorescent whitening agent, a foaming agent, a pigment, a dye, a conductivity imparting agent, an antistatic agent, a moisture permeability improver, a water repellent agent, an oil repellent agent, a hollow foamed body, a flame retardant, a water absorbent, a moisture absorbent, a deodorant, a foam stabilizer, an antiblocking agent, a hydrolysis inhibitor, or the like can be used. These additives may be used alone or in a combination of two or more kinds thereof.

It is essential that the skin layer (iii) is formed of the aqueous urethane resin composition (Z) containing the urethane resin (X) and the aqueous medium (Y), and the urethane resin (X) is a reaction product obtained by using the polyol (b1), the reactive silicone (b2) having a functional group which reacts with an isocyanate group, and the polyisocyanate (b3) as essential raw materials. The skin layer (iii) generally has a problem in adhesiveness to the intermediate layer because silicone is introduced into the urethane resin (X), but by being used in a combination with the specific intermediate layer (ii) in the present invention, excellent peeling strength as a synthetic leather can be obtained.

The urethane resin (X) can be dispersed in the aqueous medium (Y) described later, and for example, a urethane resin having a hydrophilic group such as an anionic group, a cationic group, or a nonionic group; a urethane resin forcibly dispersed in the aqueous medium (Y) with an emulsifier; or the like can be used. These urethane resins (X) may be used alone or in a combination of two or more kinds thereof. Among them, from the viewpoint of production stability, a urethane resin having a hydrophilic group is preferably used, and from the viewpoint that far superior abrasion resistance and hydrolysis resistance are obtained, a urethane resin having an anionic group is more preferably used.

Examples of a method for obtaining the urethane resin having an anionic group include a method in which one or more kinds of compounds selected from the group consisting of a glycol compound having a carboxyl group and a compound having a sulfonyl group are used as a raw material.

As the glycol compound having a carboxyl group, for example, 2,2'-dimethylolpropionic acid, 2,2'-dimethylolbutanoic acid, 2,2'-dimethylolbutyric acid, 2,2'-dimethylolpropionic acid, 2,2'-valeric acid, or the like can be used. These compounds may be used alone or in a combination of two or more kinds thereof.

As the compound having a sulfonyl group, for example, 3,4-diaminobutanesulfonic acid, 3,6-diamino-2-toluenesulfonic acid, 2,6-diaminobenzenesulfonic acid, N-(2-aminoethyl)-2-aminoethylsulfonic acid, or the like can be used. These compounds may be used alone or in a combination of two or more kinds thereof.

The carboxyl group and the sulfonyl group may be partially or entirely neutralized with a basic compound in the aqueous urethane resin composition. As the basic compound, for example, organic amine such as ammonia, triethylamine, pyridine, and morpholine; alkanolamine such as monoethanolamine and dimethylethanolamine; a metal base compound containing sodium, potassium, lithium, calcium, or the like; or the like can be used.

When a urethane resin having an anionic group (hereinafter, abbreviated as an "anionic urethane resin") is used as the urethane resin (X), from the viewpoint that a hydrophilic group promotes hydrolysis and thus far superior hydrolysis resistance is obtained and the viewpoint that far superior peeling strength is obtained, the acid value of the anionic urethane resin is preferably 20 mgKOH/g or less, more preferably 3 to 17 mgKOH/g, still more preferably 5 to 14 mgKOH/g, and particularly preferably 5 to 13 mgKOH/g. A method for measuring the acid value of the anionic urethane resin will be described in Example described later. Moreover, examples of a method of adjusting the acid value of the anionic urethane resin include a method of adjusting the use amount of the glycol compound having a carboxyl group and the compound having a sulfonyl group, which provide an anionic group.

From the viewpoint that far superior hydrolysis resistance and peeling strength are obtained, the use amount of the glycol compound having a carboxyl group and the compound having a sulfonyl group is preferably 0.1% to 5% by mass, more preferably 0.3% to 4% by mass, and still more preferably 0.5% to 3.5% by mass in the total mass of the raw materials constituting the urethane resin (X).

Examples of a method for obtaining the urethane resin having a cationic group include a method in which one or more kinds of compounds having an amino group are used as a raw material.

As the compound having an amino group, for example, a compound having a primary or secondary amino group such as triethylenetetramine and diethylenetriamine; a compound having a tertiary amino group such as N-alkyldialkanolamine, for example, N-methyldiethanolamine and N-ethyldiethanolamine and N-alkyldiaminoalkylamine, for example, N-methyldiaminoethylamine and N-ethyldiaminoethylamine; or the like can be used. These compounds may be used alone or in a combination of two or more kinds thereof.

Examples of a method for obtaining the urethane resin having a nonionic group include a method in which one or more kinds of compounds having an oxyethylene structure are used as a raw material.

As the compound having an oxyethylene structure, for example, polyether polyol having an oxyethylene structure, such as polyoxyethylene glycol, polyoxyethylene polyoxypropylene glycol, and polyoxyethylene polyoxytetramethylene glycol can be used. These compounds may be used alone or in a combination of two or more kinds thereof.

As the emulsifier which can be used for obtaining the urethane resin forcibly dispersed in the aqueous medium (Y), for example, a nonionic emulsifier such as polyoxyethylene nonylphenyl ether, polyoxyethylene lauryl ether, polyoxyethylene styrylphenyl ether, polyoxyethylene sorbitol tetraoleate, and a polyoxyethylene-polyoxypropylene copolymer; an anionic emulsifier such as fatty acid salt, for example, sodium oleate, alkyl sulfate ester salt, alkyl benzene sulfonic acid salt, alkylsulfosuccinic acid salt, naphthalene sulfonic acid salt, polyoxyethylene alkyl sulfuric acid salt, alkanesulfonate sodium salt, and alkyl diphenyl ether sulfonic acid sodium salt; a cationic emulsifier such as alkyl amine salt, alkyltrimethyl ammonium salt, and alkyldimethylbenzyl ammonium salt; or the like can be used. These emulsifiers may be used alone or in a combination of two or more kinds thereof.

Specific examples of the urethane resin (X) include a reaction product of the polyol (b1), the raw material used for producing the urethane resin having a hydrophilic group, the reactive silicone (b2) having a functional group which reacts with an isocyanate group, and the polyisocyanate (b3).

As the polyol (b1), for example, polyether polyol, polyester polyol, polyacryl polyol, polycarbonate polyol, polybutadiene polyol, or the like can be used. The polyol may be used alone or in a combination of two or more kinds thereof. As the polyol (b1), from the viewpoint that far superior abrasion resistance, hydrolysis resistance, and peeling strength are obtained, polyether polyol and/or polycarbonate polyol is preferably used and polytetramethylene glycol and/or polycarbonate polyol is more preferably used. Moreover, as the polycarbonate polyol, for the same reason, polycarbonate polyol obtained by using 1,6-hexanediol and/or 1,4-butanediol as a raw material is preferably used and polycarbonate polyol obtained by using 1,6-hexanediol and 1,4-butanediol as raw materials is more preferably used. When a urethane resin having a nonionic group is used as the urethane resin (X), a compound other than the compound having the oxyethylene structure is used as the polyol (b1).

From the viewpoint of the mechanical strength of the obtained film, the number-average molecular weight of the polyol (b1) is preferably 500 to 8,000 and more preferably 800 to 5,000. Moreover, the number-average molecular weight of the polyol (b1) indicates a value measured in the same manner as the number-average molecular weight of the polyol (a1).

From the viewpoint of the mechanical strength of the film, the amount of the polyol (b1) used is preferably 40% to 90% by mass, more preferably 45% to 88% by mass, and still more preferably 50% to 85% by mass in the total mass of the raw materials constituting the urethane resin (X).

The polyol (b1) may be used in a combination with a chain extender (b1-1) having a number-average molecular weight of to 450, if necessary. Moreover, the number-average molecular weight of the chain extender (b1-1) indicates a value obtained by measuring in the same manner as the number-average molecular weight of the polyol (b1).

As the chain extender (b1-1), for example, a chain extender having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerin, sorbitol, bisphenol A, 4,4'-dihydroxydiphenyl, 4,4'-dihydroxydiphenyl ether, and trimethylolpropane; a chain extender having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, and hydrazine; or the like can be used. These chain extenders may be used alone or in a combination of two or more kinds thereof. Among them, from the viewpoint of durability such as hydrolysis resistance and heat resistance, a chain extender having an amino group is preferably used and one or more kinds of chain extenders selected from the group consisting of ethylenediamine, isophoronediamine, and piperazine are more preferably used.

When the chain extender (b1-1) is used, the amount of the chain extender used is preferably 0.1% to 10% by mass, more preferably 0.5% to 7% by mass, and still more preferably 0.8% to 5% by mass in the total mass of the raw materials constituting the urethane resin (X), from the viewpoint of durability such as hydrolysis resistance and heat resistance.

It is essential that the reactive silicone (b2) has a functional group which reacts with an isocyanate group, in order to obtain excellent abrasion resistance and hydrolysis resistance by being incorporated in the urethane resin (A).

From the viewpoint that high slipperiness can be imparted and far superior abrasion resistance, hydrolysis resistance, and peeling strength are obtained, the number-average molecular weight of the reactive silicone (b2) is preferably 1,000 to 100,000, more preferably 2,000 to 80,000, still more preferably 3,000 to 70,000, even more preferably 4,500 to 50,000, even still more preferably 4,700 to 30,000, and particularly preferably 5,000 to 20,000. Moreover, the number-average molecular weight of the reactive silicone (b2) indicates a value obtained by measuring in the same manner as that of the polyol (a1).

As the reactive silicone (b2), for example, one-end diol-type reactive silicone, one-end monool-type reactive silicone, one-end diamine-type reactive silicone, and one-end monoamine-type reactive silicone, which are represented by Formula (1); both-end diol-type reactive silicone, both-end diamine-type reactive silicone, both-end dimercapto-type reactive silicone, and both-end disilanol-type reactive silicone, which are represented by Formula (2); side-chain monoamine-type reactive silicone represented by Formula (3); or the like can be used. The reactive silicone may be used alone or in a combination of two or more kinds thereof.

[Chem. 1]

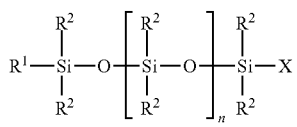
(1)

(In Formula (1), $R^1$ and $R^2$ each independently represent an alkyl group having 1 to 10 carbon atoms, X represents a structure represented by any one of Formulae (X-1) to (X-12), and n represents an integer of 50 to 670.)

[Chem. 2]

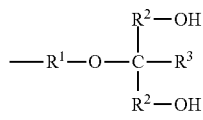
(X-1)

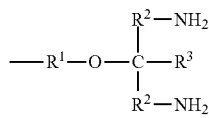
(X-2)

(In Formulae (X-1) and (X-2), $R^1$ and $R^2$ each independently represent an alkylene group having 1 to 10 carbon atoms, and $R^3$ represents a hydrogen atom or an alkyl group having 1 to 8 carbon atoms.)

[Chem. 3]

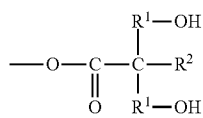
(X-3)

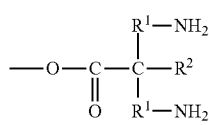
(X-4)

(In Formulae (X-3) and (X-4), $R^1$ represents an alkylene group having 1 to 10 carbon atoms, and $R^2$ represents a hydrogen atom or an alkyl group having 1 to 8 carbon atoms.)

[Chem. 4]

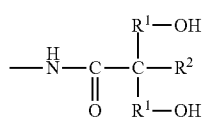
(X-5)

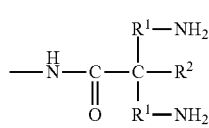
(X-6)

(In Formulae (X-5) and (X-6), $R^1$ represents an alkylene group having 1 to 10 carbon atoms, and $R^2$ represents a hydrogen atom or an alkyl group having 1 to 8 carbon atoms.)

[Chem. 5]

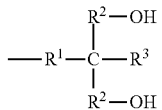
(X-7)

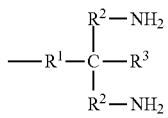
(X-8)

(In Formulae (X-7) and (X-8), $R^1$ and $R^2$ each independently represent an alkylene group having 1 to 10 carbon atoms, and $R^3$ represents a hydrogen atom or an alkyl group having 1 to 8 carbon atoms.)

[Chem. 6]

—$R^1$—O—$R^2$—OH (X-9)

—$R^1$—O—$R^2$—NH$_2$ (X-10)

(In Formulae (X-9) and (X-10), $R^1$ and $R^2$ each independently represent an alkylene group having 1 to 10 carbon atoms.)

[Chem. 7]

—$R^1$—OH (X-11)

—$R^1$—NH$_2$ (X-12)

(In Formulae (X-11) and (X-12), $R^1$ represents an alkylene group having 1 to 10 carbon atoms.)

[Chem. 8]

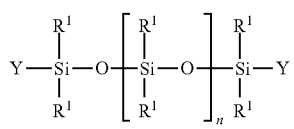
(2)

(In Formula (2), $R^1$ represents an alkyl group having 1 to 10 carbon atoms, Y represents a structure represented by any one of Formulae (Y-1) to (Y-5), and n represents an integer of 50 to 670.)

[Chem. 9]

—OH (Y-1)

[Chem. 10]

—$R^1$—OH (Y-2)

—$R^1$—NH$_2$ (Y-3)

—$R^1$—SH (Y-4)

(In Formulae (Y-2) to (Y-4), $R^1$ represents an alkylene group having 1 to 10 carbon atoms.)

[Chem. 11]

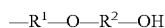

—R$^1$—O—R$^2$—OH  (Y-5)

(In Formula (Y-5), R$^1$ and R$^2$ each independently represent an alkylene group having 1 to 10 carbon atoms.)

[Chem. 12]

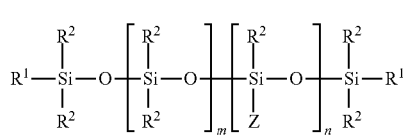

(3)

(In Formula (3), R$^1$ and R$^2$ each represent an alkyl group having 1 to 8 carbon atoms, Z represents a structure represented by Formula (Z-1) or (Z-2), m represents an integer of 50 to 670, and n represents an integer of 1 to 10.)

[Chem. 13]

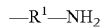

—R$^1$—NH$_2$  (Z-1)

(In Formula (Z-1), R$^1$ represents an alkylene group having 1 to 10 carbon atoms.)

[Chem. 14]

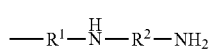

(Z-2)

(In Formula (Z-2), R$^1$ and R$^2$ each independently represent an alkylene group having 1 to 10 carbon atoms.)

As the reactive silicone (b2), for example, "SILAPLANE FM-3321", "SILAPLANE FM-3325", "SILAPLANE FM-4421", "SILAPLANE FM-4425", "SILAPLANE FM-0421", "SILAPLANE FM-0425", "SILAPLANE FM-DA21", and "SILAPLANE FM-DA26", which are manufactured by JNC Corporation; "X-22-176GX-A" and "X-22-176F", which are manufactured by Shin-Etsu Chemical Co., Ltd.; and the like can be obtained as a commercial product.

As the reactive silicone (b2), from the viewpoint that higher slipperiness is imparted due to introduction of a silicone chain into a side chain of the urethane resin (X) and far superior abrasion resistance, hydrolysis resistance, and peeling strength are obtained, reactive silicone represented by Formula (1) is preferably used, reactive silicone represented by Formula (1) where X is one or more kinds selected from the group consisting of Formulae (X-1), (X-7), and (X-9) is more preferably used, and reactive silicone represented by Formula (1) where X represents Formula (X-1) and/or (X-7) is still more preferably used. Moreover, it is preferable to use reactive silicone in which in Formula (1), R$^1$ and R$^2$ are each an alkyl group having 1 to 3 carbon atoms and n is an integer of 50 to 270, and in Formulae (X-1) and (X-7), R$^1$ and R$^2$ are each an alkylene group having 1 to 3 carbon atoms and R$^3$ is an alkyl group having 1 to 3 carbon atoms.

From the viewpoint that far superior abrasion resistance, hydrolysis resistance, and peeling strength are obtained, the amount of the reactive silicone (b2) used is preferably 1% to 25% by mass, more preferably 3% to 20% by mass, and still more preferably 3.8% to 19% by mass in the total mass of the raw materials constituting the urethane resin (A).

As the polyisocyanate (b3), for example, aromatic polyisocyanate such as phenylene diisocyanate, toluene diisocyanate, diphenylmethane diisocyanate, xylylene diisocyanate, naphthalene diisocyanate, polymethylene polyphenyl polyisocyanate, and carbodiimidated diphenylmethane polyisocyanate; aliphatic polyisocyanate and/or alicyclic polyisocyanate such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, dimer acid diisocyanate, and norbornene diisocyanate; or the like can be used. The polyisocyanate may be used alone or in a combination of two or more kinds thereof. Among them, from the viewpoint of light discoloration resistance, aliphatic polyisocyanate and/or alicyclic polyisocyanate is preferably used and one or more kinds of polyisocyanate selected from the group consisting of hexamethylene diisocyanate, isophorone diisocyanate, and dicyclohexylmethane diisocyanate are more preferably used.

From the viewpoint of production stability and mechanical properties of the obtained film, the amount of the polyisocyanate (b3) used is preferably 5% to 40% by mass, more preferably 7% to 30% by mass, and still more preferably 10% to 25% by mass in the total mass of the raw materials constituting the urethane resin (X).

Examples of a method for producing the urethane resin (X) include a method in which the polyol (b1), the raw material used for producing the urethane resin having a hydrophilic group, the reactive silicone (b2), the polyisocyanate (b3), and if necessary, the chain extender (b1-1) are charged at once and reacted with one another. The reaction may be carried out, for example, at 50° C. to 100° C. for 3 to 10 hours.

A molar ratio [isocyanate group/total of functional groups that react with isocyanate groups] of the isocyanate group of the polyisocyanate (b3) to the total of the hydroxyl group of the polyol (b1), the hydroxyl group and the amino group of the chain extender (b1-1), the functional group which reacts with the isocyanate group of the raw material used for producing the urethane resin having a hydrophilic group, and the functional group which reacts with the isocyanate group of the reactive silicone (b2) in production of the urethane resin (X) is preferably 0.8 to 1.2 and more preferably 0.9 to 1.1.

When the urethane resin (X) is produced, the isocyanate groups remaining in the urethane resin (X) are preferably deactivated. When the isocyanate groups are deactivated, alcohol having one hydroxyl group, such as methanol, is preferably used. The amount of the alcohol used is preferably 0.001 to 10 parts by mass with respect to 100 parts by mass of the urethane resin (X).

Furthermore, when the urethane resin (X) is produced, an organic solvent may be used. As the organic solvent, for example, a ketone compound such as acetone and methyl ethyl ketone; an ether compound such as tetrahydrofuran and dioxane; an acetate ester compound such as ethyl acetate and butyl acetate; a nitrile compound such as acetonitrile; an amide compound such as a dimethylformamide and N-methylpyrrolidone; or the like can be used. These organic solvents may be used alone or in a combination of two or more kinds thereof. Moreover, the organic solvent is preferably removed by a distillation method or the like when the aqueous urethane resin composition is obtained.

As the aqueous medium (Y), the same aqueous medium as the aqueous medium (B) used for forming the intermediate layer (ii) can be used. Among them, from the viewpoint of safety and reduction in an environmental load, only water or a mixture of water and an organic solvent miscible with water is preferably used and only water is more preferably used.

From the viewpoint of workability, a mass ratio [(X)/(Y)] of the urethane resin (X) to the aqueous medium (Y) is preferably 10/80 to 70/30 and more preferably 20/80 to 60/40.

The aqueous urethane resin composition (Z) of the present invention contains the urethane resin (X) and the aqueous medium (Y), but may contain other additives, if necessary.

As the other additives, for example, an emulsifier, a neutralizer, a thickener, a urethanization catalyst, a cross-linking agent, a foaming agent, a pigment, a dye, an oil repellent agent, a hollow foamed body, a flame retardant, an antifoaming agent, a leveling agent, an antiblocking agent, or the like can be used. These additives may be used alone or in a combination of two or more kinds thereof.

Next, a method for producing the synthetic leather of the present invention will be described.

Examples of a method for producing the synthetic leather include a method in which the aqueous urethane resin composition (Z) is applied on a release-treated substrate and subjected to drying and processing to obtain the skin layer (iii), then the aqueous urethane resin composition (C) is applied on the skin layer (iii) and dried to form an adhesive layer (ii), and the adhesive layer (ii) is bonded to the base fabric (i).

Examples of a method of applying the aqueous urethane resin compositions (C) and (Z) of the present invention include a method in which an applicator, a roll coater, a spray coater, a T-die coater, a knife coater, a comma coater, or the like is used.

Examples of a method of drying the aqueous urethane resin compositions (C) and (Z) include a method of performing drying at 40° C. to 130° C. for 1 to 10 minutes. The thicknesses of the obtained intermediate layer (ii) and skin layer (iii) are appropriately determined according to the application in which the synthetic leather is used and are, for example, 0.5 to 100 μm, respectively.

After the synthetic leather is produced, if necessary, aging may be performed, for example, at 30° C. to 100° C. for 1 to 10 days.

As described above, the synthetic leather of the present invention has excellent environmental compatibility because both the intermediate layer and the skin layer are formed of the aqueous urethane resin composition, and has excellent abrasion resistance, peeling strength, hydrolysis resistance, and light resistance.

EXAMPLES

Synthesis Example 1

<Preparation of Aqueous Urethane Resin Composition (PUD-1 for Intermediate Layer)>

Into a four-necked flask equipped with a stirrer, a reflux cooling tube, a thermometer, and a nitrogen blowing tube, under a nitrogen stream, 500 parts by mass of polytetramethylene glycol (number-average molecular weight: 1,000, hereinafter, abbreviated as "PTMG1000"), 15 parts by mass of dimethylolpropionic acid (hereinafter, abbreviated as "DMPA"), and 428 parts by mass of methyl ethyl ketone were added, and after being uniformly mixed, 117 parts by mass of toluene diisocyanate (hereinafter, abbreviated as "TDI") was added and then 0.1 parts by mass of dibutyltin dilaurate was added, followed by a reaction at 70° C. for about 4 hours. Next, 11 parts by mass of 1,3-butanediol (hereinafter, abbreviated as "1,3-BG") was added thereto, the resultant was reacted at 70° C. for about 1 hour, and the reaction was completed to obtain a methyl ethyl ketone solution of a urethane polymer. Subsequently, 10 parts by mass of N,N-dimethylethanolamine was added to the methyl ethyl ketone solution of the urethane polymer obtained by the method, and after a carboxyl group in the urethane polymer was neutralized, 964 parts by mass of ion-exchanged water was added thereto and then methyl ethyl ketone was distilled off under reduced pressure to obtain an aqueous urethane resin composition (nonvolatile content; 40% by mass, concentration of anionic group (carboxyl group, the same shall apply hereinafter); 0.17 mmol/g) (PUD-1 for intermediate layer).

Synthesis Example 2

<Preparation of Aqueous Urethane Resin Composition (PUD-2 for Intermediate Layer)>

Into a four-necked flask equipped with a stirrer, a reflux cooling tube, a thermometer, and a nitrogen blowing tube, under a nitrogen stream, 500 parts by mass of polycarbonate diol ("DURANOL T5652" manufactured by Asahi Kasei Chemicals Corporation, number-average molecular weight: 2,000, hereinafter, abbreviated as "PC"), 8 parts by mass of DMPA, and 394 parts by mass of methyl ethyl ketone were added, and after being uniformly mixed, 68 parts by mass of TDI was added and then 0.1 parts by mass of dibutyltin dilaurate was added, followed by a reaction at 70° C. for about 4 hours. Next, 14 parts by mass of 1,3-BG was added thereto, the resultant was reacted at 70° C. for about 1 hour, and the reaction was completed to obtain a methyl ethyl ketone solution of a urethane polymer. Subsequently, 6 parts by mass of triethylamine was added to the methyl ethyl ketone solution of the urethane polymer obtained by the method, and after a carboxyl group in the urethane polymer was neutralized, 886 parts by mass of ion-exchanged water was added thereto and then methyl ethyl ketone was distilled off under reduced pressure to obtain an aqueous urethane resin composition (nonvolatile content; 40% by mass, concentration of anionic group; 0.11 mmol/g) (PUD-1 for intermediate layer).

Synthesis Example 3

<Preparation of Aqueous Urethane Resin Composition (PUD-3 for Intermediate Layer)>

Into a four-necked flask equipped with a stirrer, a reflux cooling tube, a thermometer, and a nitrogen blowing tube, under a nitrogen stream, 500 parts by mass of polypropylene glycol (number-average molecular weight: 2,000, hereinafter, abbreviated as "PPG2000"), 9 parts by mass of 1,4-butanediol (hereinafter, abbreviated as "1,4-BG"), 10 parts by mass of DMPA, and 400 parts by mass of methyl ethyl ketone were added, and after being uniformly mixed, 78 parts by mass of TDI was added and then 0.1 parts by mass of dibutyltin dilaurate was added, followed by a reaction at 70° C. for about 4 hours. Next, 4 parts by mass of 1,3-BG was added thereto, the resultant was reacted at 70° C. for about 1 hour, and the reaction was completed to obtain a methyl ethyl ketone solution of a urethane polymer. Subsequently, 7 parts by mass of N,N-dimethylethanolamine was added to the methyl ethyl ketone solution of the urethane polymer obtained by the method, and after a carboxyl group in the urethane polymer was neutralized, 901 parts by mass of ion-exchanged water was added thereto and then methyl ethyl ketone was distilled off under reduced pressure to obtain an aqueous urethane resin composition (nonvolatile content; 40% by mass, concentration of anionic group; 0.13 mmol/g) (PUD-3 for intermediate layer).

Synthesis Example 4

<Preparation of Aqueous Urethane Resin Composition (PUD-4 for Intermediate Layer)>

Into a four-necked flask equipped with a stirrer, a reflux cooling tube, a thermometer, and a nitrogen blowing tube, under a nitrogen stream, 500 parts by mass of polytetramethylene glycol (number-average molecular weight: 2,000, hereinafter, "PTMG2000"), 3 parts by mass of ethylene glycol (hereinafter, abbreviated as "EG"), 12 parts by mass of DMPA, and 403 parts by mass of methyl ethyl ketone were added, and after being uniformly mixed, 79 parts by mass of TDI was added and then 0.1 parts by mass of dibutyltin dilaurate was added, followed by a reaction at 70° C. for about 4 hours. Next, 11 parts by mass of 1,3-BG was added thereto, the resultant was reacted at 70° C. for about 1 hour, and the reaction was completed to obtain a methyl ethyl ketone solution of a urethane polymer. Subsequently, 9 parts by mass of triethylamine was added to the methyl ethyl ketone solution of the urethane polymer obtained by the method, and after a carboxyl group in the urethane polymer was neutralized, 907 parts by mass of ion-exchanged water was added thereto and then methyl ethyl ketone was distilled off under reduced pressure to obtain an aqueous urethane resin composition (nonvolatile content; 40% by mass, concentration of anionic group; 0.15 mmol/g) (PUD-4 for intermediate layer).

Synthesis Example 5

<Preparation of Aqueous Urethane Resin Composition (PUD-1 for Skin Layer)>

Into a four-necked flask equipped with a stirrer, a reflux cooling tube, a thermometer, and a nitrogen blowing tube, under a nitrogen stream, 500 parts by mass of polycarbonate diol ("ETERNACOLL UH-200" manufactured by UBE INDUSTRIES, LTD., number-average molecular weight: 2,000, hereinafter, abbreviated as "PC-1"), 125 parts by mass of both-end diol-type reactive silicone ("SILAPLANE FM-4425" manufactured by JNC Corporation, number-average molecular weight: 10,000, hereinafter, abbreviated as "both-end diol-type Si-1"), 25 parts by mass of dimethylolpropionic acid (hereinafter, abbreviated as "DMPA"), and 360 parts by mass of methyl ethyl ketone were added, and after being uniformly mixed, 177 parts by mass of dicyclohexylmethane diisocyanate (hereinafter, abbreviated as "H$_{12}$MDI") was added and then 0.1 parts by mass of dibutyltin dilaurate was added. A reaction was performed at 70° C. for about 4 hours to obtain a methyl ethyl ketone solution of a urethane prepolymer having an isocyanate group at a molecular terminal. Subsequently, 19 parts by mass of triethylamine was added to the obtained methyl ethyl ketone solution of the urethane prepolymer, and after a carboxyl group in the urethane prepolymer was neutralized, 1960 parts by mass of ion-exchanged water was added thereto and then 14 parts by mass of ethylenediamine (hereinafter, abbreviated as "EDA") was added thereto, followed by a reaction. After completion of the reaction, methyl ethyl ketone was distilled off under reduced pressure to obtain an aqueous urethane resin composition (PUD-1 for skin layer) (nonvolatile content; 30% by mass, acid value; 13 KOHmg/g).

Synthesis Example 6

<Preparation of Aqueous Urethane Resin Composition (PUD-2 for Skin Layer)>

Into a four-necked flask equipped with a stirrer, a reflux cooling tube, a thermometer, and a nitrogen reflux tube, under a nitrogen stream, 500 parts by mass of polycarbonate diol ("DURANOL T5652" manufactured by Asahi Kasei Chemicals Corporation, number-average molecular weight: 2,000, hereinafter, abbreviated as "PC-2"), 26 parts by mass of one-end diol-type reactive silicone ("X-22-176GX-A" manufactured by Shin-Etsu Chemical Co., Ltd., number-average molecular weight: 14,000, hereinafter, abbreviated as "one-end diol-type Si-1"), 8 parts by mass of DMPA, and 269 parts by mass of methyl ethyl ketone were added, and after being uniformly mixed, 86 parts by mass of isophorone diisocyanate (hereinafter, abbreviated as "IPDI") was added and then 0.1 parts by mass of dibutyltin dilaurate was added. A reaction was performed at 70° C. for about 4 hours to obtain a methyl ethyl ketone solution of a urethane prepolymer having an isocyanate group at a molecular terminal. Subsequently, 6 parts by mass of triethylamine was added to the obtained methyl ethyl ketone solution of the urethane prepolymer, and after a carboxyl group in the urethane prepolymer was neutralized, 1463 parts by mass of ion-exchanged water was added thereto and then 7 parts by mass of piperazine (hereinafter, abbreviated as "PZ") was added thereto, followed by a reaction. After completion of the reaction, methyl ethyl ketone was distilled off under reduced pressure to obtain an aqueous urethane resin composition (PUD-2 for skin layer) (nonvolatile content; 30% by mass, acid value; 5 KOHmg/g).

Synthesis Example 7

<Preparation of Aqueous Urethane Resin Composition (PUD-3 for Skin Layer)>

Into a four-necked flask equipped with a stirrer, a reflux cooling tube, a thermometer, and a nitrogen reflux tube, under a nitrogen stream, 500 parts by mass of polycarbonate diol ("DURANOL T4692" manufactured by Asahi Kasei Chemicals Corporation, number-average molecular weight: 2,000, hereinafter, abbreviated as "PC-3"), 88 parts by mass of one-end diol-type reactive silicone ("SILAPLANE FM-DA21" manufactured by JNC Corporation, number-average molecular weight: 5,000, hereinafter, abbreviated as "one-end diol-type Si-2"), 26 parts by mass of DMPA, and 332 parts by mass of methyl ethyl ketone were added, and after being uniformly mixed, 145 parts by mass of H$_{12}$MDI was added and then 0.1 parts by mass of dibutyltin dilaurate was added. A reaction was performed at 70° C. for about 4 hours to obtain a methyl ethyl ketone solution of a urethane prepolymer having an isocyanate group at a molecular terminal. Subsequently, 20 parts by mass of triethylamine was added to the obtained methyl ethyl ketone solution of the urethane prepolymer, and after a carboxyl group in the urethane prepolymer was neutralized, 1808 parts by mass of ion-exchanged water was added thereto and then 16 parts by mass of Isophoronediamine (hereinafter, abbreviated as "IPDA") was added thereto, followed by a reaction. After completion of the reaction, methyl ethyl ketone was distilled off under reduced pressure to obtain an aqueous urethane resin composition (PUD-3 for skin layer) (nonvolatile content; 30% by mass, acid value; 14 KOHmg/g).

[Synthesis Example 8] Preparation of Aqueous Urethane Resin Composition (PUD-4 for Skin Layer)

Into a four-necked flask equipped with a stirrer, a reflux cooling tube, a thermometer, and a nitrogen reflux tube, under a nitrogen stream, 500 parts by mass of PC-2, 133 parts by mass of polytetramethylene glycol (number-average molecular weight: 1,000, hereinafter, abbreviated as "PTMF1000"), 33 parts by mass of one-end diol-type reactive silicone ("X-22-176F" manufactured by Shin-Etsu Chemical Co., Ltd., number-average molecular weight: 12,000, hereinafter, abbreviated as "one-end diol-type Si-3"), 17 parts by mass of DMPA, and 385 parts by mass of methyl ethyl ketone were added, and after being uniformly mixed, 86 parts by mass of IPDI was added and then 0.1 parts by mass of dibutyltin dilaurate was added. A reaction was performed at 70° C. for about 4 hours to obtain a methyl ethyl ketone solution of a urethane prepolymer having an isocyanate group at a molecular terminal. Subsequently, 13 parts by mass of triethylamine was added to the obtained methyl ethyl ketone solution of the urethane prepolymer, and after a carboxyl group in the urethane prepolymer was neutralized, 2098 parts by mass of ion-exchanged water was added thereto and then 15 parts by mass of EDA was added thereto, followed by a reaction. After completion of the reaction, methyl ethyl ketone was distilled off under reduced pressure to obtain an aqueous urethane resin composition (PUD-4 for skin layer) (nonvolatile content; 30% by mass, acid value; 8 KOHmg/g).

Comparative Synthesis Example 1

<Preparation of Aqueous Urethane Resin Composition (PUD'-1 for Intermediate Layer)>
Into a four-necked flask equipped with a stirrer, a reflux cooling tube, a thermometer, and a nitrogen blowing tube, under a nitrogen stream, 500 parts by mass of PTMG1000, 15 parts by mass of DMPA, and 450 parts by mass of methyl ethyl ketone were added, and after being uniformly mixed, 149 parts by mass of isophorone diisocyanate (hereinafter, abbreviated as "IPDI") was added and then 0.1 parts by mass of dibutyltin dilaurate was added, followed by a reaction at 70° C. for about 4 hours. Next, 11 parts by mass of 1,3-BG was added thereto, the resultant was reacted at 70° C. for about 1 hour, and the reaction was completed to obtain a methyl ethyl ketone solution of a urethane polymer. Subsequently, 10 parts by mass of N,N-dimethylethanolamine was added to the methyl ethyl ketone solution of the urethane polymer obtained by the method, and after a carboxyl group in the urethane polymer was neutralized, 1012 parts by mass of ion-exchanged water was added thereto and then methyl ethyl ketone was distilled off under reduced pressure to obtain an aqueous urethane resin composition (nonvolatile content; 40% by mass, concentration of anionic group; 0.16 mmol/g) (PUD'-1 for intermediate layer).

Comparative Synthesis Example 2

<Preparation of Aqueous Urethane Resin Composition (PUD'-1 for Skin Layer)>
An aqueous urethane resin composition (contains a urethane resin obtained by reacting PC-1, DMPA, IPDA, and IPDI with one another, and water, nonvolatile content; 30% by mass, acid value; 8 KOHmg/g) was set as PUD'-1 for a skin layer.

Example 1

Blended liquid including 100 parts by mass of PUD-1 for a skin layer, 10 parts by mass of a water-dispersible black pigment ("DILAC HS-9530" manufactured by DIC Corporation), and 1 part by mass of an associative thickener ("HYDRAN ASSISTER T10" manufactured by DIC Corporation) was applied on flat release paper ("DN-TP-155T" manufactured by AJINOMOTO CO., INC.) so that a film thickness after drying was 30 µm, and dried at 70° C. for 2 minutes and further at 120° C. for 2 minutes.

Subsequently, blended liquid including 100 parts by mass of PUD-1 for an intermediate layer obtained in Synthesis Example described above, 1 part by mass of an associative thickener ("HYDRAN ASSISTER T10" manufactured by DIC Corporation), and 9 parts by mass of a polyisocyanate-based crosslinking agent ("HYDRAN ASSISTER C5" manufactured by DIC Corporation) was applied thereon so that a film thickness after drying was 50 µm, and dried at 70° C. for 3 minutes. Immediately after drying, the resultant was bonded to a non-woven fabric impregnated with a urethane resin, then heat-treated at 120° C. for 2 minutes, and aged at 50° C. for 2 days. Thereafter, the release paper was peeled off to obtain a synthetic leather.

Examples 2 to 8 and Comparative Examples 1 to 3

Synthetic leathers were obtained in the same manner as in Example 1, except that PUD for an intermediate layer used and/or PUD for a skin layer used was changed as shown in Tables 1 and 2.

[Method for Measuring Number-Average Molecular Weight]

The number-average molecular weight of the polyol or the like used in Synthesis Examples was measured by a gel permeation column chromatography (GPC) method under the following conditions.

Measuring device: High performance GPC device ("HLC-8220GPC" manufactured by TOSOH CORPORATION)

Column: The following columns manufactured by TOSOH CORPORATION were used in a state of being connected in series.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (refractive index detector)
Column temperature: 40° C.
Eluent: Tetrahydrofuran (THF)
Flow rate: 1.0 mL/min
Injection volume: 100 µL (tetrahydrofuran solution with a sample concentration of 0.4% by mass)
Standard sample: A calibration curve was prepared using the following standard polystyrene.
(Standard Polystyrene)
"TSKgel standard polystyrene A-500" manufactured by TOSOH CORPORATION
"TSKgel standard polystyrene A-1000" manufactured by TOSOH CORPORATION
"TSKgel standard polystyrene A-2500" manufactured by TOSOH CORPORATION
"TSKgel standard polystyrene A-5000" manufactured by TOSOH CORPORATION
"TSKgel standard polystyrene F-1" manufactured by TOSOH CORPORATION "TSKgel standard polystyrene F-2" manufactured by TOSOH CORPORATION "TSKgel standard polystyrene F-4" manufactured by TOSOH CORPORATION "TSKgel standard polystyrene F-10" manufactured by TOSOH CORPORATION "TSKgel standard polystyrene F-20" manufactured by TOSOH CORPORATION "TSKgel standard polystyrene F-40" manufactured by TOSOH CORPORATION "TSKgel standard polystyrene F-80" manufactured by TOSOH CORPORATION "TSKgel standard polystyrene F-128" manufactured by TOSOH CORPORATION "TSKgel standard polystyrene F-288" manufactured by TOSOH CORPORATION "TSKgel standard polystyrene F-550" manufactured by TOSOH CORPORATION

[Method for Measuring Peeling Strength]

The peeling strength of each synthetic leather obtained in Examples and Comparative Examples was measured using Shimadzu autograph "AG-1" (manufactured by Shimadzu Corporation) under the conditions where a full scale is 5 kg and a head speed is 20 mm/min, and evaluated as follows.

"A"; 0.2 MPa or more
"B"; 0.1 MPa or more and less than 0.2 MPa
"C"; less than 0.1 MPa

[Method for Evaluating Hydrolysis Resistance]

Each synthetic leather obtained in Examples and Comparative Examples was allowed to stand for 5 weeks under the conditions where a temperature is 70° C. and humidity is 95%. Thereafter, the peeling strength was measured in the same manner as in [Method for measuring peel strength], and a retention ratio of the peeling strength before and after being allowed to stand was calculated and evaluated as follows.

"A"; 70% or more
"B"; 50% or more and less than 70%
"C"; less than 50%

[Method for Evaluating Light Resistance]

Each synthetic leather obtained in Examples and Comparative Examples was irradiated with light for 100 hours by using FADE METER "U48AU" (63° C. and humidity of 50%) manufactured by Suga Test Instruments Co., Ltd. Thereafter, the synthetic leather was visually observed and evaluated as follows.

"A"; There was no change in appearance.
"B"; Slight yellowing was observed in appearance.
"C"; considerable yellowing was observed in appearance.

[Method for Evaluating Abrasion Resistance]

A plane abrasion test (JASO-M403-88B method, load; 1 kg, stroke; 140 mm) was performed on the obtained synthetic leather, the number of times until the surface of the synthetic leather was worn and the base fabric was observed was measured, and evaluation was performed as follows.

"A"; 30,000 times or more
"B"; 10,000 times or more and less than 30,000 times
"C"; less than 10,000 times

TABLE 1

| | | Example 1 | Example 2 | Example 3 | Example 4 | Example 5 |
|---|---|---|---|---|---|---|
| Intermediate layer (ii) | Aqueous urethane resin composition (C) | PUD-1 for intermediate layer | PUD-2 for intermediate layer | PUD-3 for intermediate layer | PUD-4 for intermediate layer | PUD-1 for intermediate layer |
| | Polyol (a1) | | | | | |
| | Polyol (a-1) having anionic group | DMPA | DMPA | DMPA | DMPA | DMPA |
| | Other types of polyol | PTMG1000 | PC | PPG2000 | PTMG2000 | PC |
| | Aromatic polyisocyanate (a2) | TDI | TDI | TDI | TDI | TDI |
| | Chain extender | | | 1,4-BG | EG | |
| | Concentration of anionic group (mmol/g) | 0.17 | 0.11 | 0.13 | 0.15 | 0.11 |
| | Concentration of aromatic ring (mol/kg) | 1.05 | 0.67 | 0.74 | 0.75 | 0.67 |
| | Weight-average molecular weight | 55,000 | 29,000 | 68,000 | 46,000 | 29,000 |
| Skin layer (iii) | Aqueous urethane resin composition (Z) | PUD-1 for skin layer | PUD-2 for skin layer | PUD-3 for skin layer | PUD-4 for skin layer | PUD-2 for skin layer |
| | Polyol (b1) | PC-1 | PC-2 | PC-3 | PTMG1000 | PC-2 |
| | Chain extender (b1-1) | EDA | PZ | IPDA | EDA | PZ |
| | Raw material used for producing urethane resin having hydrophilic group | DMPA | DMPA | DMPA | DMPA | DMPA |
| | Reactive silicone (b2) Type | Both-end diol-type Si-1 | One-end diol-type Si-1 | One-end diol-type Si-2 | One-end diol-type Si-3 | One-end diol-type Si-1 |
| | Number-average molecular weight | 10,000 | 14,000 | 5,000 | 12,000 | 14,000 |
| | Polyisocyanate (b3) | H12MDI | IPDI | H12MDI | IPDI | IPDI |
| | Acid value (mgKOH/g) | 13 | 5 | 14 | 8 | 5 |
| Evaluation of peeling strength | | A | A | A | A | A |
| Evaluation of hydrolysis resistance | | A | A | A | A | A |
| Evaluation of light resistance | | A | A | A | A | A |
| Evaluation of abrasion resistance | | A | A | A | A | A |

TABLE 2

|  |  | Example 6 | Example 7 | Example 8 | Comparative Example 1 | Comparative Example 2 | Comparative Example 3 |
|---|---|---|---|---|---|---|---|
| Intermediate layer (ii) | Aqueous urethane resin composition (C) | PUD-3 for intermediate layer | PUD-1 for intermediate layer | PUD-2 for intermediate layer | PUD-1 for intermediate layer | PUD'-1 for intermediate layer | PUD'-1 for intermediate layer |
|  | Polyol (a1) |  |  |  |  |  |  |
|  | Polyol (a-1) having anionic group | DMPA | DMPA | DMPA | DMPA | DMPA | DMPA |
|  | Other types of polyol | PPG2000 | PTMG1000 | PC | PTMG1000 | PTMG1000 | PTMG1000 |
|  | Aromatic polyisocyanate (a2) | TDI | TDI | TDI | TDI | IPDI | IPDI |
|  | Chain extender | 1,4-BG |  |  |  |  |  |
|  | Concentration of anionic group (mmol/g) | 0.13 | 0.17 | 0.11 | 0.17 | 0.16 | 0.16 |
|  | Concentration of aromatic ring (mol/kg) | 0.74 | 1.05 | 0.67 | 1.05 | 0 | 0 |
|  | Weight-average molecular weight | 68,000 | 55,000 | 29,000 | 55,000 | 54,000 | 54,000 |
| Skin layer (iii) | Aqueous urethane resin composition (Z) | PUD-4 for skin layer | PUD-4 for skin layer | PUD-3 for skin layer | PUD'-1 for skin layer | PUD-1 for skin layer | PUD'-for skin layer |
|  | Polyol (b1) | PTMG1000 | PTMG1000 | PC-3 | PC-1 | PC-1 | PC-1 |
|  | Chain extender (b1-1) | EDA | EDA | IPDA |  | EDA |  |
|  | Raw material used for producing urethane resin having hydrophilic group | DMPA | DMPA | DMPA | DMPA | DMPA | DMPA |
|  | Reactive silicone (b2)    Type | One-end diol-type Si-3 | One-end diol-type Si-3 | One-end diol-type Si-2 |  | Both-end diol-type Si-1 |  |
|  | Number-average molecular weight | 12,000 | 12,000 | 5,000 |  | 10,000 |  |
|  | Polyisocyanate (b3) | IPDI | IPDI | H12MDI | IPDI | H12MDI | IPDI |
|  | Acid value (mgKOH/g) | 8 | 8 | 14 | 8 | 13 | 8 |
| Evaluation of peeling strength |  | A | A | A | B | C | C |
| Evaluation of hydrolysis resistance |  | A | A | A | A | A | B |
| Evaluation of light resistance |  | A | A | A | A | A | B |
| Evaluation of abrasion resistance |  | A | A | A | C | A | C |

It was found that Examples 1 to 8, which are the synthetic leathers of the present invention, are excellent in abrasion resistance, peeling strength, hydrolysis resistance, and light resistance.

On the other hand, Comparative Example 1 was an embodiment in which the skin layer was formed of an aqueous urethane resin containing a urethane resin into which silicone was not introduced, but abrasion resistance was extremely poor.

Comparative Example 2 was an embodiment in which the intermediate layer was formed of an aqueous urethane resin containing a urethane resin obtained by using alicyclic polyisocyanate as a raw material, but peeling strength was extremely poor.

Comparative Example 3 was an embodiment in which the skin layer was formed of an aqueous urethane resin containing a urethane resin into which silicone was not introduced and the intermediate layer was formed of an aqueous urethane resin containing a urethane resin obtained by using alicyclic polyisocyanate as a raw material, but abrasion resistance and peeling strength were extremely poor.

The invention claimed is:

1. A synthetic leather comprising:
   a base fabric (i);
   an intermediate layer (ii); and
   a skin layer (iii),
   wherein the intermediate layer (ii) is formed of an aqueous urethane resin composition (C) containing a urethane resin (A) and an aqueous medium (B),
   wherein the urethane resin (A) is a reaction product of a polyol (a1) containing a polyol (a1-1) having an anionic group and an aromatic polyisocyanate (a2), or a reaction product of a polyol (a1) containing a polyol (a1-1) having an anionic group, an aromatic polyisocyanate (a2), and a chain extender (a3) containing an aliphatic polyol compound, and has the anionic group in a concentration of 0.35 mmol/g or less,
   wherein the aliphatic polyol compound is 1,4-butanediol or ethylene glycol,
   wherein the skin layer (iii) is formed of an aqueous urethane resin composition (Z) containing a urethane resin (X) and an aqueous medium (Y), and the urethane resin (X) is a reaction product obtained by using a polyol (b1), a reactive silicone (b2) having a functional group which reacts with an isocyanate group, and a polyisocyanate (b3) as essential raw materials,
   wherein the reactive silicone (b2) has a number-average molecular weight of 4,000 or more,
   wherein the reactive silicone (b2) is one-end diol-type reactive silicone that is represented by formula (1):

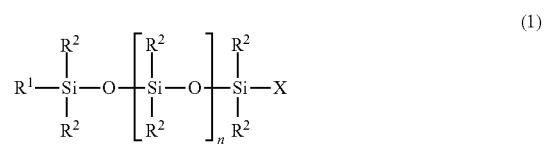

(1)

where $R^1$ and $R^2$ each independently represent an alkyl group having 1 to 10 carbon atoms, X represents a structure represented by any one of following formulae (X-1), (X-3), (X-5), and (X-7), and n represents an integer of 50 to 670,

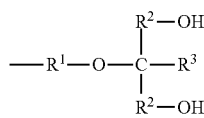

(X-1)

where $R^1$ and $R^2$ each independently represent an alkylene group having 1 to 10 carbon atoms, and $R^3$ represents a hydrogen atom or an alkyl group having 1 to 8 carbon atoms,

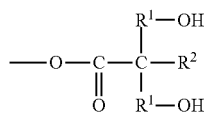

(X-3)

where $R^1$ represents an alkylene group having 1 to 10 carbon atoms, and $R^2$ represents a hydrogen atom or an alkyl group having 1 to 8 carbon atoms,

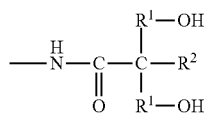

(X-5)

where $R^1$ represents an alkylene group having 1 to 10 carbon atoms, and $R^2$ represents a hydrogen atom or an alkyl group having 1 to 8 carbon atoms, and

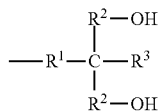

(X-7)

where $R^1$ and $R^2$ each independently represent an alkylene group having 1 to 10 carbon atoms, and $R^3$ represents a hydrogen atom or an alkyl group having 1 to 8 carbon atoms.

2. The synthetic leather according to claim 1, wherein the aromatic polyisocyanate (a2) is toluene diisocyanate.

3. The synthetic leather according to claim 1, wherein a concentration of an aromatic ring in the urethane resin (A) is from 0.1 to 2.5 mol/kg.

4. The synthetic leather according to claim 1, wherein the urethane resin (A) has a weight-average molecular weight of 2,000 to 150,000.

5. The synthetic leather according to claim 1, wherein the urethane resin (X) is an anionic urethane resin having an acid value of 20 mgKOH/g or less.

6. The synthetic leather according to claim 2, wherein a concentration of an aromatic ring in the urethane resin (A) is from 0.1 to 2.5 mol/kg.

* * * * *